United States Patent [19]
Ragaly

[11] 3,763,398
[45] Oct. 2, 1973

[54] BATTERY CHARGING SYSTEM SUPPLIED FROM A POLYPHASE GENERATOR

[75] Inventor: Istvan Ragaly, Stuttgart, Germany

[73] Assignee: Robert Bosch GmbH, Gerlingen-Schillerhohe, Germany

[22] Filed: Aug. 8, 1972

[21] Appl. No.: 278,808

[30] Foreign Application Priority Data
Sept. 30, 1971 Germany............... P 21 48 810.8

[52] U.S. Cl................ 317/13 R, 317/40 A, 317/43, 317/52, 320/53
[51] Int. Cl............................................ H02p 9/00
[58] Field of Search................. 317/13 R, 43, 52, 317/40 A; 320/53, 59; 322/59, 79, 89, 90

[56] References Cited
UNITED STATES PATENTS

| | | | |
|---|---|---|---|
| 3,067,361 | 12/1962 | Jensen et al. | 317/43 |
| 2,896,126 | 7/1959 | Hoff, Jr. | 317/DIG. 7 UX |
| 3,530,366 | 9/1970 | Schwarm | 322/90 |
| 3,025,450 | 3/1962 | Krabbe | 322/79 X |

FOREIGN PATENTS OR APPLICATIONS

| | | |
|---|---|---|
| 2,030,967 | 11/1970 | France |
| 444,451 | 2/1969 | Japan |

Primary Examiner—James D. Trammell
Attorney—Robert D. Flynn et al.

[57] ABSTRACT

To provide for reverse polarity protection without substantial, additional components in star-connected polyphase generator battery charging systems, in which a pair of diodes are connected to the center, star point of the generator and direct current for battery charging is obtained from a polyphase bridge circuit, the protective fuse is interconnected in the additional diode circuit, preferably with the positive output terminal of the generator (in a negative-ground system) to simultaneously protect against over current and reverse polarity.

9 Claims, 1 Drawing Figure

Patented Oct. 2, 1973 3,763,398
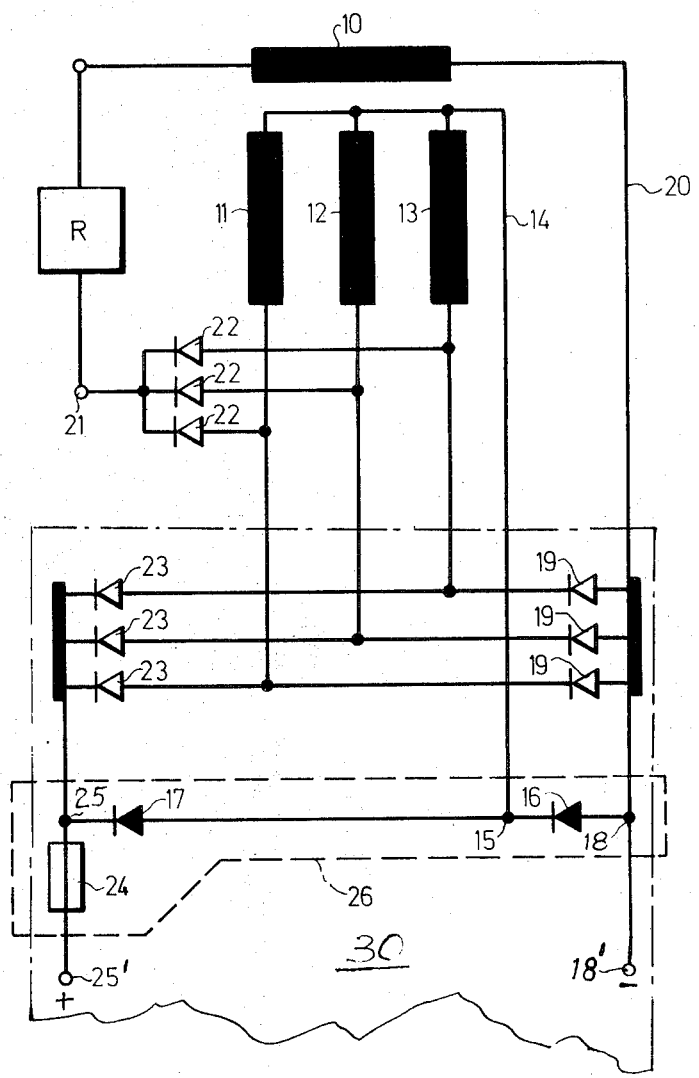

BATTERY CHARGING SYSTEM SUPPLIED FROM A POLYPHASE GENERATOR

The present invention relates to a battery charging system by means of a polyphase generator, and more particularly to a battery charging system in which a three-phase generator is star-connected, for use in automotive vehicles and the like, and in which the star point is connected to the direct current network, that is, to the battery, over at least a pair of additional diodes in parallel to the main rectifier from the polyphase generator.

Battery charging systems of this type have previously been proposed (see Japanese Patent Publication 44/4451) by providing a pair of additional diodes, connected in parallel to a three-phase bridge rectifier. The junction point of the diodes is connected to the star or center point of the generator, and the other terminal ends of the diodes are connected respectively to the positive and negative output of the three-phase bridge rectifier. This circuit improves the output power obtainable from the generator. It has also been proposed to provide a reverse-polarity protection for a single phase generator, in which a battery is connected in parallel to the generator, in utilizing a diode, and a fuse in series (see French Patent Publication No. 69–44953).

It is an object of the present invention to improve the arrangements previously proposed by decreasing the number of components necessary, to simplify the circuit, and to provide an output circuit with high efficiency from a polyphase star connected generator which can be easily and economically constructed.

SUBJECT MATTER OF THE PRESENT INVENTION

Briefly, the additional diodes, and a fuse are combined in a network which provides both the improved output power obtainable from the known rectifying circuit connecting a polyphase generator to a secondary battery, as well as protection against reverse polarity in case the battery, when changed, should inadvertently be connected with reverse polarity to the generator.

The negative terminal, for a Separate system, is directly connected to ground, or chassis, in case of an automotive vehicle. The fuse is arranged between the positive battery terminal and the positive output of the bridge-type three-phase rectifier, when the positive additional diode is located between the positive output of the bridge rectifier and the center star connection. In accordance with a preferred form, and particularly to simplify construction and assembly with a generator, the fuse and the additional diodes can be combined as a separate sub-assembly which, preferably, is secured in or on the generator. The number of separate elements for the entire battery charging system is thereby reduced, and operating reliability is improved. Separate interconnection cables can be entirely eliminated or, at least, substantially shortened.

The invention will be described by way of example with reference to the accompanying drawings, wherein the single FIGURE is a schematic circuit and partly constructional diagram of the battery charging system of the present invention applied to a three-phase generator.

A star-connected three-phase generator has a field winding 10 and three armature windings 11, 12, 13. The star or center connection of the output windings is a junction 14 connected to a junction point 15. Junction point 15 is connected to the cathode of a negative additional, or current control diode 16 and further to the anode of a positive additional or current control diode 17. The anode of the negative diode 16 is connected to the negative terminal 18 of the bridge rectifier, which also forms the output terminal 18', of the battery charging system, to be connected to the negative terminal of a battery (not shown). The negative terminal 18 likewise is connected to the anodes of negative main rectifying diodes 19 of a bridge rectifier, the cathodes of which are connected to output windings 11, 12, 13, respectively, which are additionally connected to the anodes of rectifiers 23, the cathodes of which are connected to the positive output terminal 25 formed by the rectifiers 19, 23. A connection 20 extends from the negative terminal 18 of the rectifier formed of diodes 19, 23, to the field winding 10; the positive terminal of the field winding is connected to a voltage regulator, schematically shown as R, the positive terminal 21 of which is connected to the cathodes of a group of diodes 22 to supply power for the field winding. The anodes of the three diodes 22, which may be termed exciter diodes, are connected to the outputs of armature windings 11, 12, and 13, respectively.

The positive output terminal 25 of the bridge rectifier, formed by the cathodes of diodes 23 is connected to the cathode of the additional or current control diode 17. A fuse, schematically shown at 24, is connected between terminal 25 and the positive terminal 25' of the battery charging system, adapted to be connected to the battery, not shown.

The two additional diodes 16, 17 as well as fuse 24 are located on a common assembly structure 26 which is secured to the generator, preferably to the end bell, protective bearing structure thereof. This permits interchange of the element 26 as a separate assembly. Fuse 24 is preferably held in a separate fuse holder for separate replacement thereof. 19

The arrangement as described permits increased output power to be obtained from the generator by use of the diodes 16 and 17 which, simultaneously, function as components of a reverse-polarity protective circuit. A separate, additional blocking diode to provide reverse-polarity protection can be omitted if the two diodes 16, 17 are utilized in a circuit as described.

The temperature rise in the diodes 16, 17 depends on the power delivered by the star point of the generator, which, in turn, depends on the construction and loading on the generator itself. This heating, just as the power taken from the generator, may vary within wide limits. If it is expected that the additional diodes will be highly loaded, so that they require cooling similar to the main power diodes of the bridge rectifier, then the additional diodes 16 and 17 can be located together with diodes 19, 23 on a common cooling fin or shield schematically indicated at 30 and forming part of the generator structure.

The invention has been described particularly in connection with a three-phase generator; various changes and modifications may be made within the inventive concept and other polyphase generators than threee-phase generators may be used.

I claim:

1. In a star-connected polyphase generator, fused, battery charging system with protection against inadvertent connection of the battery to the terminals (18', 25') of the system with reverse polarity having
  a fuse (24);
  a polyphase bridge rectifier circuit (19, 23) having d-c output terminals (18, 25);
  and a pair of additional diodes (16, 17) having unlike polarized electrodes connected to the center star point (14) of the polyphase generator and their other terminals, each, connected to the d-c output terminals (18, 25) of the bridge rectifier circuit, said system output terminals (18, 25) being protected against reversely applied voltages,
  the improvement wherein
  the fuse (24) is connected between one terminal (25') of the battery charging system and the junction (25) between the polyphase bridge rectifier circuit (19, 23) and one of the additional diodes (17) and formed by one of said output terminals (25) of the rectifier circuit,
  to form a reverse polarity protective network.

2. System according to claim 1, wherein the diodes (16, 17) are connected to the output terminals (18, 25) of the bridge rectifier circuit.

3. System according to claim 2, wherein the fuse (24) is connected into the positive terminal (25') of the battery charging system.

4. System according to claim 1, wherein the fuse (24) is connected between the positive terminal (25') of the battery charging system and the positive output terminal (25) of the bridge rectifier circuit (19, 23);
  and one of the additional diodes (17) forms the positive diode connection between the positive output terminal (25) of the bridge rectifier circuit (19, 23) and the star point (14) of the generator to provide a series circuit comprising:
  fuse (24) - cathode - anode of positive diode (17) between the positive output terminal (25') of the system and the star point (14) of the generator.

5. System according to claim 1, wherein the fuse (24) and the additional diodes (16, 17) form a unitary assembly (26).

6. System according to claim 5, wherein the assembly (26) is secured to the polyphase generator (30).

7. System according to claim 1, wherein the generator has a cooling body (30), and the additional diodes (16, 17) are secured in thermal conductive relation to the cooling body (30) to provide for cooling of said diodes.

8. System according to claim 1, wherein said generator is a three-phase generator.

9. System according to claim 1, wherein said 1125' is a three-phase generator; chrging positive output
  the fuse (24) is connected between the positive terminal 25') of the battery charging system and the positive output terminal (25) of the bridge rectifier circuit, said bridge rectifier circuit including six diodes (19, 23);
  one additional diode (17) forms the positive diode, connected between the positive output terminal (25) of the bridge rectifier circuit and the star point (14) of the three-phase generator to provide a series circuit including the fuse (24), and the cathode - anode path of the positive diode (17) between the positive output terminal (25') of the system and the center star point (14) of the three-phase generator.

* * * * *